United States Patent
Utsunomiya et al.

(10) Patent No.: US 12,255,535 B2
(45) Date of Patent: Mar. 18, 2025

(54) ELECTRONIC DEVICE INCLUDING BOOST CIRCUIT

(71) Applicant: ABLIC Inc., Tokyo (JP)

(72) Inventors: Fumiyasu Utsunomiya, Tokyo (JP); Takakuni Douseki, Shiga (JP); Ami Tanaka, Shiga (JP)

(73) Assignee: ABLIC Inc., Nagano (JP)

( * ) Notice: Subject to any disclaimer, the term of this patent is extended or adjusted under 35 U.S.C. 154(b) by 321 days.

(21) Appl. No.: 18/072,719

(22) Filed: Dec. 1, 2022

(65) Prior Publication Data
US 2023/0170802 A1    Jun. 1, 2023

(30) Foreign Application Priority Data
Dec. 1, 2021    (JP) ................... 2021-195319

(51) Int. Cl.
*H02M 3/158* (2006.01)
(52) U.S. Cl.
CPC .................. *H02M 3/158* (2013.01)
(58) Field of Classification Search
CPC .................................................. H02M 3/158
See application file for complete search history.

(56) References Cited

U.S. PATENT DOCUMENTS

| | | | | |
|---|---|---|---|---|
| 6,163,141 A | * | 12/2000 | Yoshida | H02J 7/0063 |
| | | | | 323/284 |
| 2005/0265052 A1 | * | 12/2005 | Utsunomiya | H02M 3/073 |
| | | | | 363/60 |
| 2006/0256591 A1 | * | 11/2006 | Utsunomiya | H02M 3/156 |
| | | | | 363/59 |
| 2018/0152100 A1 | | 5/2018 | Utsunomiya et al. | |
| 2018/0175727 A1 | * | 6/2018 | Utsunomiya | H02M 1/36 |
| 2018/0367034 A1 | * | 12/2018 | Utsunomiya | H02M 3/156 |

FOREIGN PATENT DOCUMENTS

JP    2018085888    5/2018

* cited by examiner

*Primary Examiner* — Rafael O De Leon Domenech
(74) *Attorney, Agent, or Firm* — JCIPRNET

(57) ABSTRACT

An electronic device with a boost circuit includes: a first capacitor including a first terminal connected to an input terminal and a second terminal connected to a reference potential terminal; a first rectification element; a second capacitor including a first terminal connected to the first terminal of the first capacitor through the first rectification element and a second terminal connected to the reference potential terminal; a voltage detection circuit including a voltage detection terminal connected to the first terminal of the second capacitor and a detection signal output terminal; and a boost circuit including a detection signal input terminal connected to the detection signal output terminal, a boost power input terminal connected to the first terminal of the first capacitor, and a boost power output terminal connected to a node between the first terminal of the second capacitor and the voltage detection terminal.

8 Claims, 3 Drawing Sheets

ELECTRONIC DEVICE INCLUDING BOOST CIRCUIT

CROSS-REFERENCE TO RELATED APPLICATION

This application claims the priority benefit of Japan application serial no. 2021-195319, filed on Dec. 1, 2021. The entirety of the above-mentioned patent application is hereby incorporated by reference herein and made a part of this specification.

BACKGROUND

Field of the Invention

The present invention relates to an electronic device including a boost circuit.

Description of the Related Art

In a case where input power is converted into boost power by a boost circuit, the boost circuit cannot be operated unless the input power is higher than or equal to self-power consumption of the boost circuit. Thus, in a conventional electronic device including a boost circuit, the following configuration has been proposed: a storage capacitor is provided at an input of the boost circuit; power necessary for causing a load to operate for a predetermined time is stored in the storage capacitor; and the boost circuit is operated by the power accumulated in the storage capacitor (for example, refer to Japanese Patent Application Laid-Open 2018-085888).

In the conventional electronic device including a boost circuit, in the case where a stored voltage of the storage capacitor increases, the boost circuit starts a boost operation by a voltage detection circuit that detects a voltage of the stored voltage. In the case where the boost circuit starts the boost operation, the stored voltage of the storage capacitor decreases, and in the case where the stored voltage decreases to a voltage lower than or equal to a detection release voltage of the voltage detection circuit, the boost operation of the boost circuit may stop. In order to avoid stopping the boost operation, once the boost circuit starts the operation, it is necessary to add thereto a circuit that functions to continue the operation regardless of an output signal of the voltage detection circuit.

SUMMARY

An aspect of the present invention has an object to provide an electronic device including a boost circuit that maintains the boost operation of the boost circuit without addition of a circuit. An electronic device including a boost circuit according to one aspect of the present invention is an electronic device includes: an input terminal; a first capacitor including a first terminal connected to the input terminal and a second terminal connected to a reference potential terminal for providing a reference potential; a first rectification element which includes a first terminal connected to the first terminal of the first capacitor and a second terminal and in which a direction from the first terminal to the second terminal is set as a forward direction; a second capacitor including a first terminal connected to the first terminal of the first capacitor through the first rectification element and a second terminal connected to the reference potential terminal; a voltage detection circuit including a voltage detection terminal connected to the first terminal of the second capacitor and a detection signal output terminal; and a boost circuit including a detection signal input terminal connected to the detection signal output terminal, a boost power input terminal connected to the first terminal of the first capacitor, and a boost power output terminal connected to a node between the first terminal of the second capacitor and the voltage detection terminal.

An electronic device including a boost circuit according to another aspect of the present invention is an electronic device includes: an input terminal; a first capacitor including a first terminal connected to the input terminal and a second terminal connected to a reference potential terminal for providing a reference potential; a booster including: a boost circuit including a boost power input terminal connected to the first terminal of the first capacitor; a boost power output terminal to which a power obtained by converting a power transmitted from the boost power input terminal is supplied; a coil containing a first terminal connected to the boost power input terminal and a second terminal connected to the boost power output terminal; a rectification element rectifying a current supplied from the boost circuit; and a smoothing circuit which includes a second capacitor including a first terminal and a second terminal connected to the reference potential terminal, and which smooths the current; a voltage detection circuit including a voltage detection terminal from which a stored voltage in the second capacitor is received, and a detection signal output terminal to which a detection signal is supplied in a state where the voltage received from the voltage detection terminal is larger than a prescribed voltage, the boost circuit further including a detection signal input terminal connected to the detection signal output terminal.

According to the electronic device including a boost circuit, it is possible to maintain a boost operation without adding thereto a circuit that functions to continue the boost operation.

DESCRIPTION OF EMBODIMENTS

Embodiments of the present invention will be described hereinafter with reference to the drawings.

First Embodiment

Figure 1:
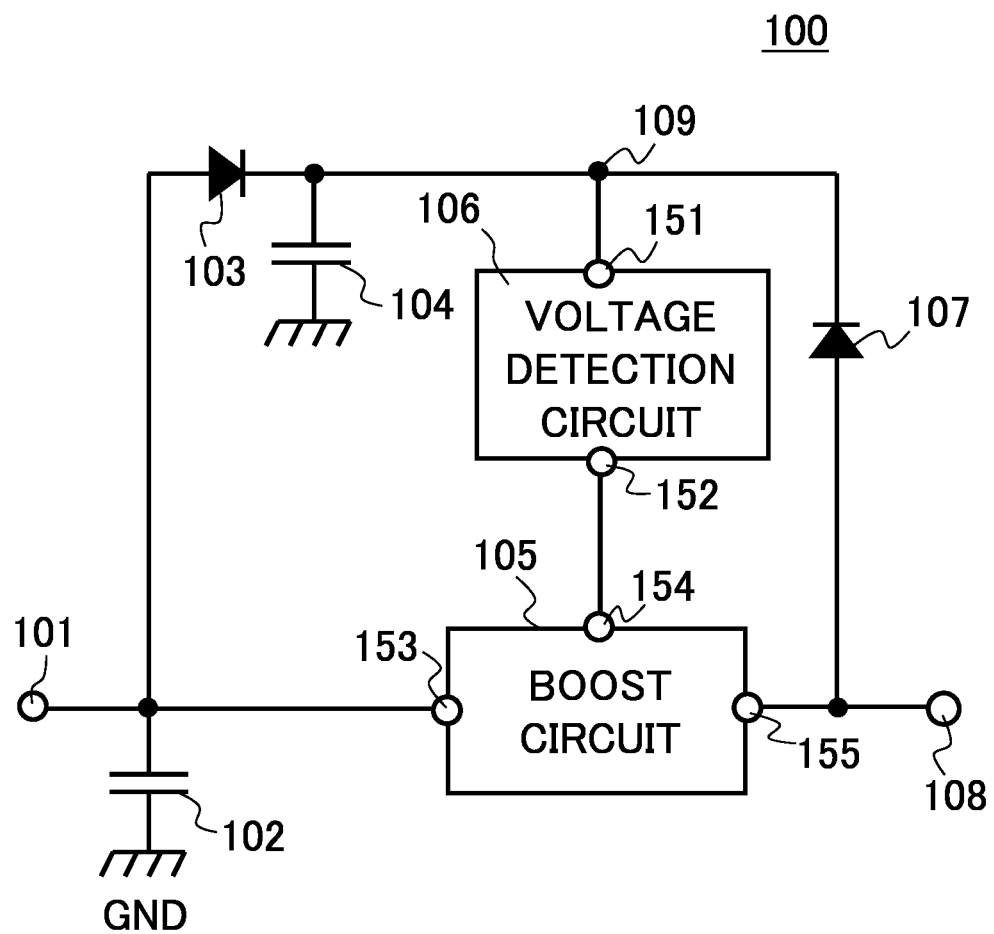
FIG. 1 is a circuit diagram illustrating an example of an electronic device including a boost circuit according to a first embodiment of the present invention.

FIG. 1 is a circuit diagram illustrating an electronic device 100 serving as an example of an electronic device including a boost circuit according to a first embodiment of the present invention. The electronic device 100 includes an input terminal 101, a capacitor 102, a rectification element 103, a capacitor 104, a boost circuit 105, a voltage detection circuit 106, a rectification element 107, and an output terminal 108. The boost circuit 105 includes a boost power input terminal 153, a detection signal input terminal 154, and a boost power output terminal 155. The voltage detection circuit 106 includes a voltage detection terminal 151 and a detection signal output terminal 152.

The capacitor 102 includes a first terminal connected to the input terminal 101 and a second terminal connected to a GND terminal as a reference potential terminal for providing a reference potential. The rectification element 103 includes a first terminal connected to the first terminal of the capacitor 102 and a second terminal and in which a direction from the first terminal to the second terminal is set as a forward direction. The capacitor 104 includes a first terminal connected to the first terminal of the capacitor 102 through the rectification element 103 and a second terminal connected to the GND terminal. The voltage detection terminal 151 is connected to the first terminal of the capacitor 104. In the boost circuit 105, the boost power input terminal 153 is connected to the first terminal of the capacitor 102. The detection signal input terminal 154 is connected to the detection signal output terminal 152. The boost power output terminal 155 is connected to a first terminal of the rectification element 107 and the output terminal 108. A second terminal of the rectification element 107 which is a second rectification element is connected to the first terminal of the capacitor 104 and the voltage detection terminal 151 through the node 109. That is, the rectification element 107 is connected between the boost power output terminal 155 and the node 109. A second terminal of the capacitor 102 and a second terminal of the capacitor 104 each are connected to the GND terminal. Description for the connection to the GND terminal is partially omitted.

An operation of the electronic device 100 which is the electronic device including the boost circuit of the first embodiment will be described.

Power to be received by the input terminal 101 is stored in the capacitor 102 which is a first capacitor and at the same time is stored in the capacitor 104 which is a second capacitor through the rectification element 103. The boost circuit 105 receives the stored power of the capacitor 102 at the boost power input terminal 153. The voltage detection circuit 106 detects a stored voltage of the capacitor 104 connected to the voltage detection terminal 151. The voltage detection circuit 106 supplies a detection signal from the detection signal output terminal 152 in response to the detection that the stored voltage of the capacitor 104 becomes higher than or equal to a predetermined voltage (hereinafter, referred to as a "detection voltage"). In the case where the detection signal input terminal 154 receives the detection signal supplied from the voltage detection circuit 106, the boost circuit 105 converts the stored power of the capacitor 102 connected to the boost power input terminal 153 into a boost power. The boost circuit 105 supplies the boost power from the boost power output terminal 155. The boost power to be supplied by the boost circuit 105 is supplied from the output terminal 108 and at the same time is stored in the capacitor 104 through the rectification element 107.

The voltage detection circuit 106 supplies the detection signal from the detection signal output terminal 152 in the case where a voltage of the voltage detection terminal 151, that is, the stored voltage of the capacitor 104 becomes higher than or equal to a predetermined detection voltage. The voltage detection circuit 106 stops supplying the detection signal in the case where the voltage of the voltage detection terminal 151 becomes lower than or equal to a predetermined voltage (hereinafter, referred to as a "detection release voltage") lower than the detection voltage.

With the above-described configuration, in the case where the capacitor 102 is stored with the power, the capacitor 104 is also stored with the power. In the case where the capacitor 104 is stored with the power up to a predetermined stored voltage by which the detection signal is supplied from the voltage detection circuit 106, the detection signal is supplied from the voltage detection circuit 106. In the case where the detection signal input terminal 154 receives the detection signal, the boost circuit 105 converts the stored power of the capacitor 102 into the boost power. In the case where the boost circuit 105 starts an operation, the stored voltage of the capacitor 102 decreases, but the stored voltage of the capacitor 104 does not decrease at the same time as the stored voltage of the capacitor 102 because the rectification element 103 is present. In the case where the boost circuit 105 starts the operation, the converted boost power is supplied from the boost power output terminal 155. The boost power to be supplied from the boost circuit 105 is stored in the capacitor 104 through the rectification element 107. The stored voltage of the capacitor 104 is kept higher than the detection release voltage due to the boost power to be supplied from the boost circuit 105. As a result that the stored voltage of the capacitor 104 is maintained to be higher than the detection release voltage, the voltage detection circuit 106 can continue supplying the detection signal, and the boost circuit 105 can maintain the boost operation without stopping.

The boost circuit 105 continues the boost operation by using the stored power that has been stored in the capacitor 102. In the case where the stored power of the capacitor 102 is less than a value at which the boost circuit 105 can be operated, the boost circuit 105 stops the boost operation.

In this way, in the electronic device 100, the stored power is stored in the capacitor 102 and the capacitor 104 due to the power to be first received by the input terminal 101. Next, in the case where the stored voltage of the capacitor 104 reaches a predetermined voltage, the boost circuit 105 starts an operation. In the case where the stored power of the capacitor 102 is less than the value at which the boost circuit 105 can be operated, the boost circuit 105 finally stops the operation.

According to the electronic device 100, by virtue of the boost power supplied from the boost circuit 105, the stored voltage of the capacitor 104 that once becomes higher than or equal to a detection voltage of the voltage detection circuit 106 can be maintained at a voltage higher than a detection release voltage of the voltage detection circuit 106. It is thus possible to provide an electronic device including the boost circuit capable of continuing a boost operation without an additional circuit for maintaining the boost operation of the boost circuit 105. Although the additional circuit is an essential component of the conventional electronic device including the boost circuit, the electronic device 100 does not include the additional circuit. Thus, the electronic device 100 can be made at lower cost than the conventional electronic device the boost circuit.

Second Embodiment

Figure 2:
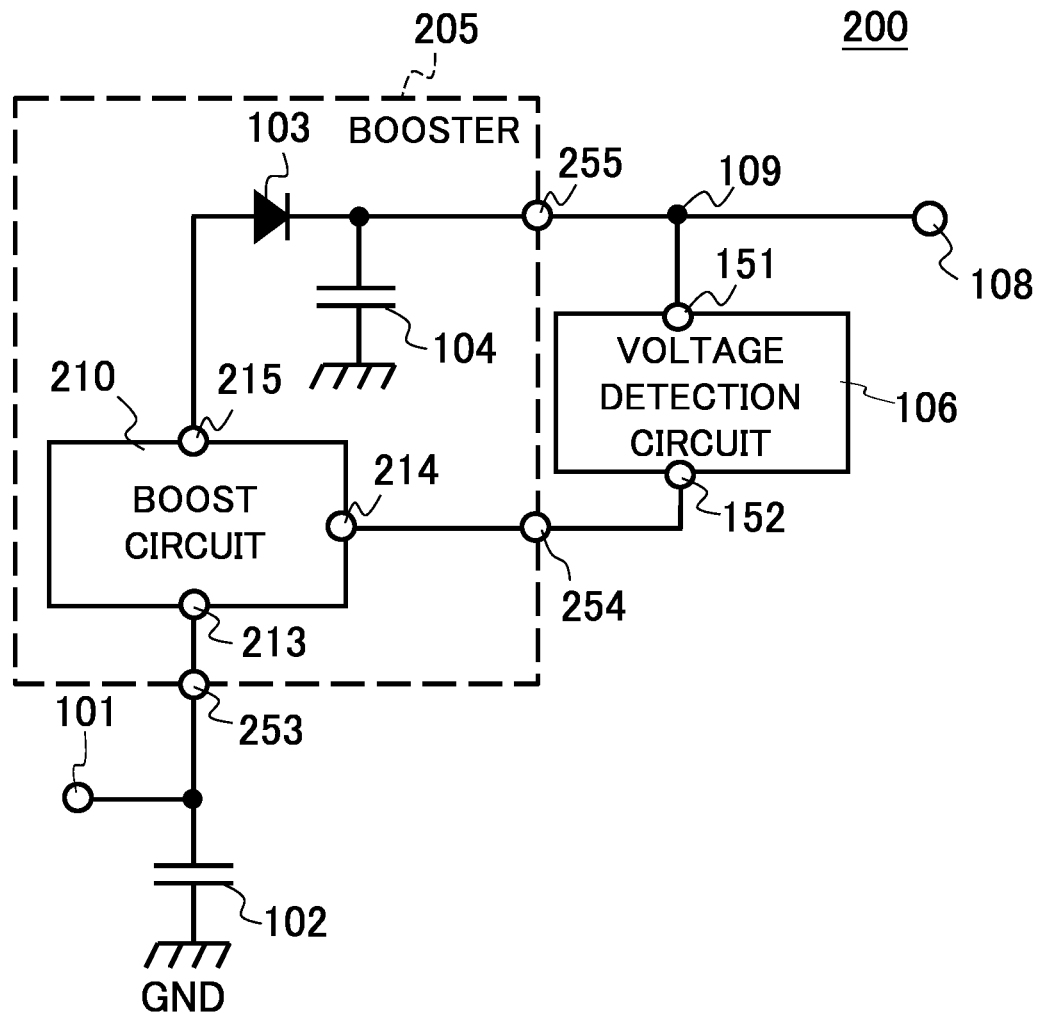
FIG. 2 is a circuit diagram illustrating an example of an electronic device including a boost circuit according to a second embodiment of the present invention.
Figure 3:
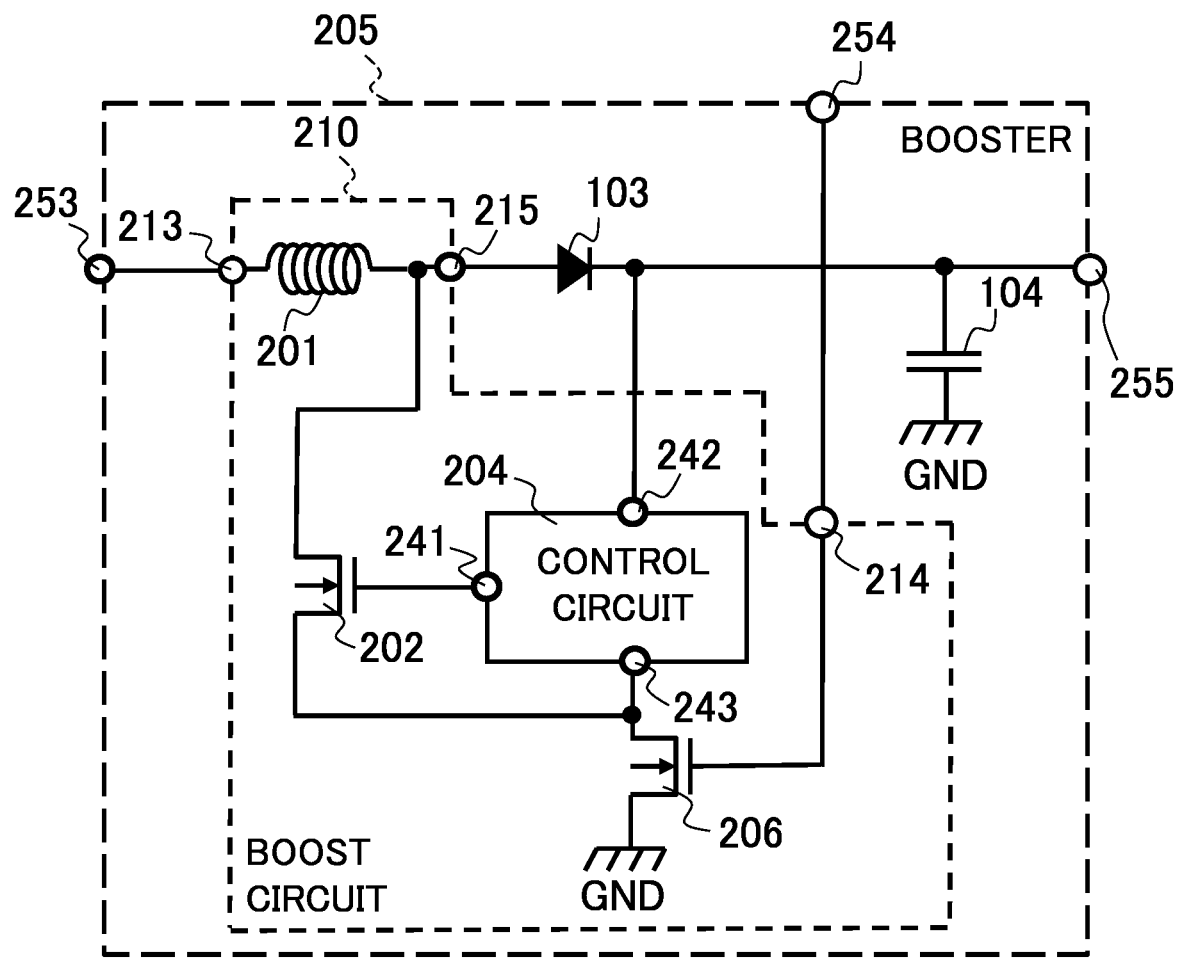
FIG. 3 is a circuit diagram illustrating an example of a booster included in the electronic device including the boost circuit according to the second embodiment.

FIG. 2 is a circuit diagram illustrating an electronic device 200 serving as an example of an electronic device including a boost circuit according to a second embodiment of the present invention. FIG. 3 is a circuit diagram including a configuration example of a booster 205 having a boost circuit 210 of the electronic device 200 serving as an example of a booster included in the electronic device including the boost circuit according to the second embodiment. The electronic device 200 is different from the electronic device 100 in this respect. That is, the electronic device 200 includes the same components as those of the electronic device 100 except the rectification element 107 and the boost circuit 210 instead of the boost circuit 105. Thus, the same components are designated with the corresponding references, and the duplicated description will be omitted.

The electronic device 200 includes an input terminal 101, a capacitor 102, a booster 205 including a boost circuit 210, an output terminal 108, and a voltage detection circuit 106. The booster 205 includes the boost circuit 210, a rectification element 103, a capacitor 104, a boost power input terminal 253, a detection signal input terminal 254, and a boost power output terminal 255. The boost circuit 210 includes a boost power input terminal 213, a detection signal input terminal 214, a boost power output terminal 215, a coil 201, an N-channel MOS transistor (hereinafter, referred to as an "NMOS transistor") 202, an NMOS transistor 206, and a control circuit 204. The control circuit 204 includes a control signal output terminal 241, a power supply terminal 242, and a GND potential input terminal 243.

Connection of the electronic device 200 will be described. The input terminal 101 is connected to a first terminal of the capacitor 102 and a first terminal of the coil 201 through the boost power input terminal 253 of the booster 205 and the boost power input terminal 213 of the boost circuit 210. A second terminal of the coil 201 is connected to the boost power output terminal 215. The boost power output terminal 215 is connected to a first terminal of the rectification element 103 and a drain of the NMOS transistor 202 in addition to the second terminal of the coil 201. A second terminal of the rectification element 103 is connected to the power supply terminal 242 of the control circuit 204, a first terminal of the capacitor 104, and the boost power output terminal 255 of the booster 205. The boost power output terminal 255 is connected to a voltage detection terminal 151 and the output terminal 108 through a node 109 in the outside of the booster 205. The node 109 illustrated in FIG. 2 is a connection point between the first terminal of the capacitor 104 included in the booster 205 and the voltage detection terminal 151.

In the electronic device 200, the rectification element 103 sets as a forward direction which is a direction from a first terminal thereof connected to the first terminal of the capacitor 102 to a second terminal thereof connected to the first terminal of the capacitor 104 and is provided between the boost power output terminal 215 of the boost circuit 210 and the node 109. From this connection relationship, the rectification element 103 in the electronic device 200 is doubled as the rectification element 107 provided between the boost power output terminal 155 of the boost circuit 105 and the node 109 in the electronic device 100.

The control signal output terminal 241 is connected to a gate of the NMOS transistor 202. A drain of the NMOS transistor 206 is connected to the GND potential input terminal 243 and a source of the NMOS transistor 202. In the booster 205, a gate of the NMOS transistor 206 is connected to the detection signal input terminal 214 and is further connected to the detection signal input terminal 254 through the detection signal input terminal 214. The detection signal input terminal 254 is connected to the detection signal output terminal 152 in the outside of the booster 205. A second terminal of the capacitor 102, a second terminal of the capacitor 104, and a source of the NMOS transistor 206 each are connected to a GND terminal. Description for the connection to the GND terminal is partially omitted.

An operation of the electronic device 200 which is an electronic device including a boost circuit of the second embodiment will be described. Power to be received by the input terminal 101 is stored in the capacitor 102 and at the same time is received by the booster 205. Power to be inputted from the boost power input terminal 253 to the boost circuit 210 through the boost power input terminal 213 is supplied to the drain of the NMOS transistor 202 through the coil 201 and is also supplied to the control circuit 204 through the coil 201 and the rectification element 103. Power to be received by the boost circuit 210 and supplied from the boost circuit 210 through the coil 201 supplied to the capacitor 104 through the rectification element 103.

The supplied power is stored in the capacitor 104 and simultaneously stored in the capacitor 102. The stored power that has been stored in the capacitor 104 is supplied from the boost power output terminal 255 to the outside of the booster 205 and is inputted to the voltage detection terminal 151. The voltage detection circuit 106 detects the stored voltage of the capacitor 104 connected to the voltage detection terminal 151 and supplies a detection signal from the detection signal output terminal 152 responsive to the detection that the stored voltage of the capacitor 104 becomes higher than or equal to the detection voltage. The detection signal supplied from the voltage detection circuit 106 is supplied to the boost circuit 210 through the detection signal input terminal 254 and the detection signal input terminal 214 and is supplied to the gate of the NMOS transistor 206. In the case where the detection signal supplied from the voltage detection circuit 106 is supplied to the gate, the NMOS transistor 206 is put in an on-state. The GND potential input terminal 243 and the source of the NMOS transistor 202 are connected to the GND terminal by the NMOS transistor 206 put in the on-state.

In the case where the GND potential input terminal 243 is connected to the GND terminal, the control circuit 204 inputs a switching signal for turning on/off the NMOS transistor 202 from the terminal 251 to the gate of the NMOS transistor 202. Since the source of the NMOS transistor 202 is connected to the GND terminal, a coil current to be generated each time the NMOS transistor 202 is turned on is stored in the capacitor 104 through the rectification element 103 each time the NMOS transistor 202 is turned off, and at the same time is rectified and smoothed, so that the resultant is supplied from the boost power output terminal 255. In this way, the booster 205 supplies boost power from the boost power output terminal 255.

With the above-described configuration, in the case where the capacitor 102 is stored with the power, the capacitor 104 is also stored with the power through the coil 201 and the rectification element 103. In the case where the capacitor 104 is stored with the power up to a predetermined stored voltage by which a detection signal is supplied from the voltage detection circuit 106, a detection signal is supplied from the voltage detection circuit 106 to the booster 205. In the case where the detection signal is input from the detection signal input terminal 254 to the boost circuit 210 through the detection signal input terminal 214, the boost circuit 210 of the booster 205 converts the stored power of the capacitor 102 into the boost power. In the case where the booster 205 (more specifically to the boost circuit 210) starts an operation, the stored voltage of the capacitor 102 decreases, but the stored voltage of the capacitor 104 does not decrease at the same time as the stored voltage of the capacitor 102 because the rectification element 103 is present. In the case where the boost circuit 210 starts the operation, the boost power is stored in the capacitor 104, and thus, the stored voltage of the capacitor 104 is kept higher than the detection release voltage of the voltage detection circuit 106. The voltage detection circuit 106 can thus continue supplying the detection signal, and the boost circuit 210 can maintain the boost operation without stopping.

In the booster 205, the boost circuit 210 continues the boost operation by using the stored power that has been stored in the capacitor 102. In the case where the stored power of the capacitor 102 is less than a value that enables an operation of the boost circuit 210, the boost circuit 210 stops the boost operation, and the booster 205 stops the boost operation.

In this way, in the electronic device 200, the stored power is stored in the capacitor 102 and the capacitor 104 due to the power to be first received by the input terminal 101. Next, in the case where the stored voltage of the capacitor 104 reaches a prescribed voltage, the booster 205 starts a boost operation. In the case where the stored power of the capacitor 102 decreases, the booster 205 finally stops the boost operation.

According to the electronic device 200, by virtue of the boost power supplied from the booster 205, the stored voltage of the capacitor 104 that once becomes higher than or equal to a detection voltage of the voltage detection circuit 106 can be maintained at a voltage higher than the detection release voltage of the voltage detection circuit 106. It is thus possible to provide an electronic device including a boost circuit capable of continuing the boost operation without an additional circuit for continuing the boost operation of the booster 205. Although in conventional electronic device including the boost circuit, the additional circuit is necessary to continue the boost operation, the electronic device 200 can continue the boost operation without including the additional circuit. Thus, the electronic device 200 can be made at a lower cost than the conventional electronic device.

In accordance with the electronic device with the boost circuit according to at least one embodiment of the present invention, the electronic device capable of continuing the boost operation can be provided even without an additional circuit, which is conventionally required, for continuing the boost operation of the boost circuit.

The present invention is not limited to the above-described embodiment as it is, and can be implemented in various forms other than the above-described examples at the implementation stage. Various omissions, substitutions, and changes can be made without departing from the gist of the present invention. The above-described embodiment or the variation thereof is included in the scope and gist of the present invention, and is also included in the scope of the present invention described in the claims and the equivalent scope thereof.

What is claimed is:

1. An electronic device including a boost circuit, the electronic device comprising:
    an input terminal;
    a first capacitor including a first terminal connected to the input terminal and a second terminal connected to a reference potential terminal for providing a reference potential;
    a first rectification element which includes a first terminal connected to the first terminal of the first capacitor and a second terminal and in which a direction from the first terminal to the second terminal is set as a forward direction;
    a second capacitor including a first terminal connected to the first terminal of the first capacitor through the first rectification element and a second terminal connected to the reference potential terminal;
    a voltage detection circuit including a voltage detection terminal connected to the first terminal of the second capacitor and a detection signal output terminal; and
    a boost circuit including a detection signal input terminal connected to the detection signal output terminal, a boost power input terminal connected to the first terminal of the first capacitor, and a boost power output terminal connected to a node between the first terminal of the second capacitor and the voltage detection terminal.

2. The electronic device including a boost circuit according to claim 1, further comprising a second rectification element provided between the boost power output terminal and the node.

3. The electronic device including a boost circuit according to claim 1, further comprising a coil provided between the first terminal of the first capacitor and the first terminal of the first rectification element.

4. The electronic device including a boost circuit according to claim 3,
    wherein the first rectification element is connected between the boost power output terminal and the node.

5. An electronic device including a boost circuit, the electronic device comprising:
    an input terminal;
    a first capacitor including a first terminal connected to the input terminal and a second terminal connected to a reference potential terminal for providing a reference potential;
    a booster including:
        a boost circuit including a boost power input terminal connected to the first terminal of the first capacitor;
        a boost power output terminal to which a power obtained by converting a power transmitted from the boost power input terminal is supplied;
        a coil containing a first terminal connected to the boost power input terminal and a second terminal connected to the boost power output terminal;
        a rectification element rectifying a current supplied from the boost circuit; and
        a smoothing circuit which includes a second capacitor including a first terminal and a second terminal connected to the reference potential terminal, and which smooths the current;
    a voltage detection circuit including a voltage detection terminal from which a stored voltage in the second capacitor is received, and a detection signal output terminal to which a detection signal is supplied in a state where the voltage received from the voltage detection terminal is larger than a prescribed voltage,
    the boost circuit further including a detection signal input terminal connected to the detection signal output terminal.

6. The electronic device including a boost circuit according to claim 5, further comprising an output terminal,
    wherein the first terminal of the second capacitor is connected to the output terminal and the voltage detection terminal.

7. The electronic device including a boost circuit according to claim 5,
    wherein the rectification element includes an anode connected to the boost power output terminal, and a cathode connected to the first terminal of the second capacitor and the voltage detection terminal.

8. The electronic device including a boost circuit according to claim 5,
 wherein the rectification circuit is provided on both a first path and a second path,
 wherein the first path is provided between the first terminal of the first capacitor and the first terminal of the second capacitor, and
 wherein the second path is provided between the boost power output terminal and a node between the first terminal of the second capacitor and the voltage detection terminal.

* * * * *